United States Patent
Yamada

(10) Patent No.: US 11,321,027 B2
(45) Date of Patent: May 3, 2022

(54) PRINTING METHOD, INFORMATION PROCESSING APPARATUS EMPLOYING PRINTING METHOD, AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/689,136

(22) Filed: Nov. 20, 2019

(65) Prior Publication Data

US 2020/0174718 A1    Jun. 4, 2020

(30) Foreign Application Priority Data

Nov. 30, 2018   (JP) .............................. JP2018-224860

(51) Int. Cl.
  *G06F 3/12*   (2006.01)
(52) U.S. Cl.
  CPC .......... *G06F 3/1225* (2013.01); *G06F 3/1203* (2013.01); *G06F 3/1293* (2013.01); *G06F 3/1201* (2013.01); *G06F 3/1204* (2013.01)
(58) Field of Classification Search
  CPC .... G06F 3/1225; G06F 3/1203; G06F 3/1293; G06F 3/1289; G06F 3/1247; G06F 3/1212; G06F 3/1201; G06F 3/1204

(Continued)

(56) References Cited

U.S. PATENT DOCUMENTS 6,646,759 B1 * 11/2003 Koga ................... G06K 15/02
                                                358/1.9
7,461,375 B2 * 12/2008 Kazumi ............... G06F 9/4411
                                                717/176

(Continued)

FOREIGN PATENT DOCUMENTS

JP       2017-134718 A     8/2017

*Primary Examiner* — Darryl V Dottin
(74) *Attorney, Agent, or Firm* — Scully, Scott, Murphy & Presser, PC

(57) ABSTRACT

A non-transitory computer-readable recording medium storing instructions executable by a controller of an information processing apparatus. When executed by the controller, the instructions realize a support program corresponding to a printer connected to the information processing apparatus. When a print instruction is input through a printing program, the support program causes the information processing apparatus to obtain printer information stored in a memory, the printing program being implemented, in advance, in an operating system of the information processing apparatus. When driver identifying information is contained in the printer information and a printer driver identified by the driver identifying information contained in the printer information is not installed in the operation system, the support program causes the information processing apparatus to cause the information processing apparatus to perform an operation regarding installation of the printer driver in the operation system, the printer driver corresponding to the printer.

15 Claims, 6 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 2002/0022990 A1* | 2/2002 | Kurata | B41J 29/393 |
| | | | 705/14.14 |
| 2004/0030809 A1* | 2/2004 | Lozano | G06F 9/4411 |
| | | | 710/8 |
| 2006/0023243 A1* | 2/2006 | Asai | H04N 1/32496 |
| | | | 358/1.13 |
| 2012/0293834 A1* | 11/2012 | Honda | G06F 3/1285 |
| | | | 358/1.15 |
| 2017/0223210 A1 | 8/2017 | Yamada | |
| 2018/0146110 A1* | 5/2018 | Kitagawa | G06F 8/61 |
| 2018/0373519 A1* | 12/2018 | Kitabatake | G06F 3/1225 |

\* cited by examiner

PRINTING METHOD, INFORMATION PROCESSING APPARATUS EMPLOYING PRINTING METHOD, AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2018-224860 filed on Nov. 30, 2018. The entire subject matter of the application is incorporated herein by reference.

BACKGROUND

Technical Field

The present disclosures relate to a printing method, an information process apparatus employing the printing method and a non-transitory computer-readable recording medium containing instructions realizing a support program configured to control operations of a printer.

Related Art

There has been known a configuration, in accordance with a technique of controlling the printer through the information processing apparatus, of installing a printer driver in the information processing apparatus, generating print data with use of the printer driver and transmitting the generated print data to the printer has been widely known. The printer driver is typically provided by the make of the printer. Such a printer driver is compliant to all the functions the printer has, thereby a user making fully use of the printer.

Recently, a technique of controlling a printer by means of a printing program implemented as standard in an operating system (OS) without using the printer driver has been realized. According to such a technique, when the OS detects the printer, the OS associates the printer with an OS-standard printing program. Thereafter, when the OS receives a print instruction to perform printing with the printer, it is possible to perform printing with use of the OS-standard printing program.

When printing operations based on the OS-standard printing program is performed, all the functions of the printer may not be used. For example, a printing speed or a printing quality in a case where the OS-standard printing program is used may become lower in comparison with a case where the printer driver is used, which may force inconvenience upon the user.

According to aspects of the present disclosures, there is provided a non-transitory computer-readable recording medium storing instructions executable by a controller of an information processing apparatus, a printer being connected with the information processing apparatus, the instructions realizing a support program corresponding to the printer, the support program causing, when executed by the controller. When a print instruction is input through a printing program, the information processing apparatus to perform obtaining printer information stored in a memory of the information processing apparatus, the print instruction being an instruction to cause the printer to perform printing, the printer being connected to the information processing apparatus, the printing program being implemented, in advance, in an operating system of the information processing apparatus. When driver identifying information is contained in the printer information and a printer driver identified by the driver identifying information contained in the printer information is not installed in the operation system, the information processing apparatus to perform causing the information processing apparatus to perform an operation regarding installation of the printer driver in the operation system, the printer driver corresponding to the printer.

According to aspects of the present disclosures, there is also provided an information processing apparatus, which is provided with a memory, a non-transitory computer-readable recording medium and a controller. Computer-executable instructions are stored in the recording medium, the computer-executable instructions realizing a support program, the supporting program being a program corresponding to a printer, the printer being connected with the information processing apparatus, the support program being installed in the information processing apparatus, an operating system of the information processing apparatus having a printing program, the printing program being different from a printer driver. The memory stores printer information regarding the printer, the printer information including driver identifying information, the driver identifying information identifying a printer driver corresponding to the printer. When a print instruction is input through the printing program, the support program causes, when executed by the controller, the information processing apparatus to obtain printer information stored in a memory of the image processing apparatus, the print instruction being an instruction to cause the printer to perform printing. When the printer driver identified by the driver identifying information is not installed in the operating system, the support program causes, when executed by the controller, the information processing apparatus to perform an operation regarding installation of the printer driver in the operating system.

According to aspects of the present disclosures, there is also provided a printing method of an information processing apparatus, a printer being connected with the information processing apparatus, instructions realizing a support program corresponding to the printer being installed in the information processing apparatus, an operating system of the information processing apparatus having a printing program, the printing program being different from a printer driver. A memory of the information processing apparatus stores printer information regarding the printer, the printer information including driver identifying information, the driver identifying information identifying a printer driver corresponding to the printer, the method causing the printer to perform printing based on print data, the print data being generated by the information processing apparatus. The method includes, when a print instruction is input through the printing program, obtaining the printer information stored in the memory, the print instruction being an instruction to cause the printer to perform printing, and when a printer driver identified by the driver identifying information is not installed in the operation system, causing the information processing apparatus to perform an operation regarding installation of the printer driver in the operation system.

BRIEF DESCRIPTION OF THE ACCOMPANYING DRAWINGS

DETAILED DESCRIPTION OF THE EMBODIMENT

Hereinafter, referring to the accompanying drawings, a print system using programs according an illustrative embodiment, will be described. A print system according to the present embodiment includes a PC 1 and a printer 2 (see FIG. 1). The PC 1 is an example of an information processing apparatus. The printer 2 is a device having a printing function. The printer 2 is configured to communicates with the PC 1 through a local communication or a network communication.

Figure 1:
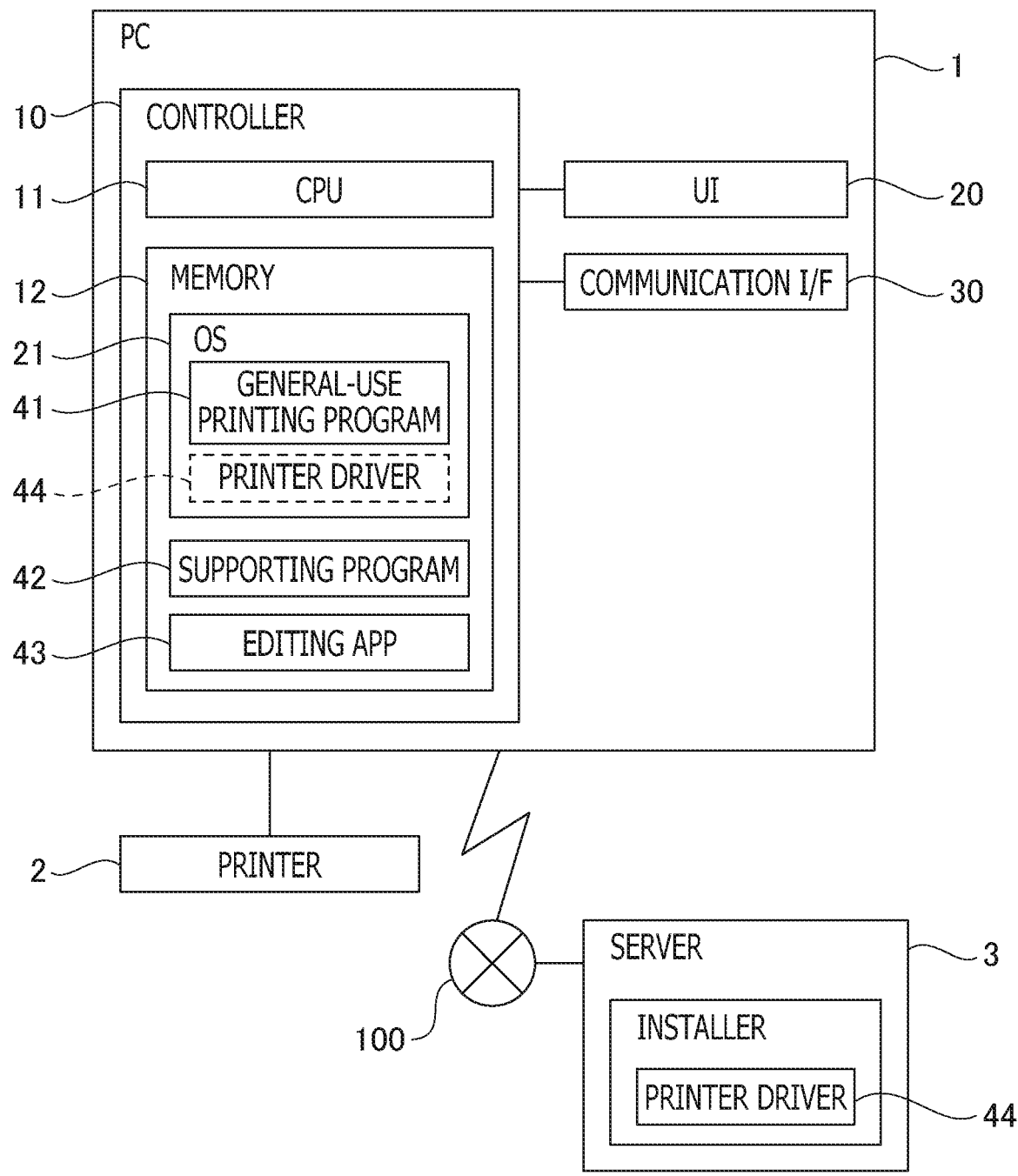
FIG. 1 is a block diagram showing an electrical configuration of a printing system according to an illustrative embodiment.

As shown in FIG. 1, the PC 1 includes a controller 10, a user interface (UI) 20 and a communication I/F 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function.

The communication I/F 30 includes hardware for communicating with the printer 2 and a hardware for accessing the Internet 100. The communication I/F 30 may include multiple interfaces respectively employing different communication methods. Examples of the communication methods may include the network communication, a USB communication and the like.

The controller 10 includes a CPU 11 and a memory 12. The CPU 11 is an example of a computer. The memory 12 includes a ROM, a RAM and a non-volatile memory. The memory 12 contains various application programs (hereinafter, referred to as APP's) and various pieces of data. According to the present disclosures, the ROM, the RAM and the non-volatile memory will not be distinguished from each other unless necessary. The CPU 11 performs various processes in accordance with programs retrieved from the memory 12 or in accordance with user's instructions. It should be noted that the "controller" 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a support program. The supporting program 42 is, for example, a hardware support APP (abbreviated as HAS) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It should be noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

The general-use printing program 41 is an APP to cause a printer (various printers such as the printer 2) to perform printing from the PC 1. The general-use printing program 41 is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various device venders. The general-use printing program 41 is configured to cause any of the plurality of models of printers to perform operations which are commonly implemented in the plurality of models of printers. Alternatively, the general-use printing program 41 may be a program supplied from the device venders to a vender of the OS 21 so that the general-use printing program 41 is implemented in the OS 21 (e.g., a kind of printer driver supplied by a device vender to be implemented in the OS 21).

Programs developed by respective venders of the devices after the general-use printing program 41 to be implemented in the OS 21 has been supplied to the vender of the OS 21 can be added to the PC 1 by installing the same. In the following description, printer drivers which can be added to the PC 1 by installation (i.e., not the program which has been implemented in the OS 21) will be simply referred to as the "printer drivers" or "vender drivers." In other words, the "printer driver" is not the program which has been implemented in the OS 21 in advance but a program which needs to be installed in the OS 21 according to a particular process in order to user the same. For example, an installer designated through the UI 20 or the OS 21 installs the printer driver in the OS 21. The printer drivers are prepared by the venders of the printers so as to correspond to respective models of the printers. Thus, a printer driver corresponding to a particular printer may be configured to receive instructions to perform functions which are intrinsic to the particular printer.

There may be a case where the printer driver, or the vender driver exhibits a higher performance than the general-use program 41 implemented in the OS 21 in advance. For example, the print data generated by the printer driver may be processed more efficiently by the printer than the print data generated by the general-use printing program 41, and thus, a printing speed of the image data generated by the printer driver may be faster than the printing speed of the image data generated by the general-use printing program 41. The print data generated by the printer driver may cause the printer to print a printed matter having a better color developing property than the print data generated by the general-use printing program 41. The print data generated by the printer driver may cause the printer to print a printed matter having a higher printing resolution than the print data generated by the general-use printing program 41. Further, the printer driver may instruct the printer to perform a function intrinsic to the printer which cannot be instructed by the general-use printing program 41. In this case, the function intrinsic to the printer may include, for example, a mirror-reversed printing function and a black/white inversion printing function.

The supporting program 42 is a program which performs processes based on the instruction by the OS 21 in association with the startup of the general-use printing program 41 and supports controlling of hardware subjected to the instruction. The supporting program 42 is started, for example, by the OS 21. The supporting program 42 is an APP corresponding to a model of the printer 2, which is subjected to be controlled. Typically, the supporting program 42 is prepared by the vender of the device (e.g., the printer) subjected to be controlled. Generally, the vender of the device registers the supporting program 42 with a platform supplied by the vender of the OS 21 in accordance with a procedure designated by the vender of the OS 21. When a printer 2 is newly connected to the PC 1 and the supporting program corresponding to the printer 2 is registered with the platform, the OS 21 downloads the supporting program 42 from a sever in which the supporting program 42 is install the same in the PC 1.

The OS 21 associates identification information of the incorporated supporting program 42 with the printer information of the connected printer 2 and stores the same in the memory 12. In the PC 1 to which a plurality of modes of printers are connected, a plurality of supporting programs respectively corresponding to the plurality of models are incorporated, and information associating the plurality of printers with the plurality of supporting programs is stored in the memory 12. That is, in the memory 12, as the printer information for each of the printers connected to the PC 1, information on the corresponding supporting program 42 is stored in addition to the model information and the access information of each printer.

The editing APP is, for example, an APP for generating and/or editing image data and document data. Examples of the editing APP 43 are Microsoft Word® and Power Point®. The editing APP 43 is configured to receive an user operation including an instruction to cause the printer 2 to perform a particular operation. For example, the editing APP 43 is configured to receive a print instruction which causes the printer 2 to perform printing through the UI 120.

Figure 2:
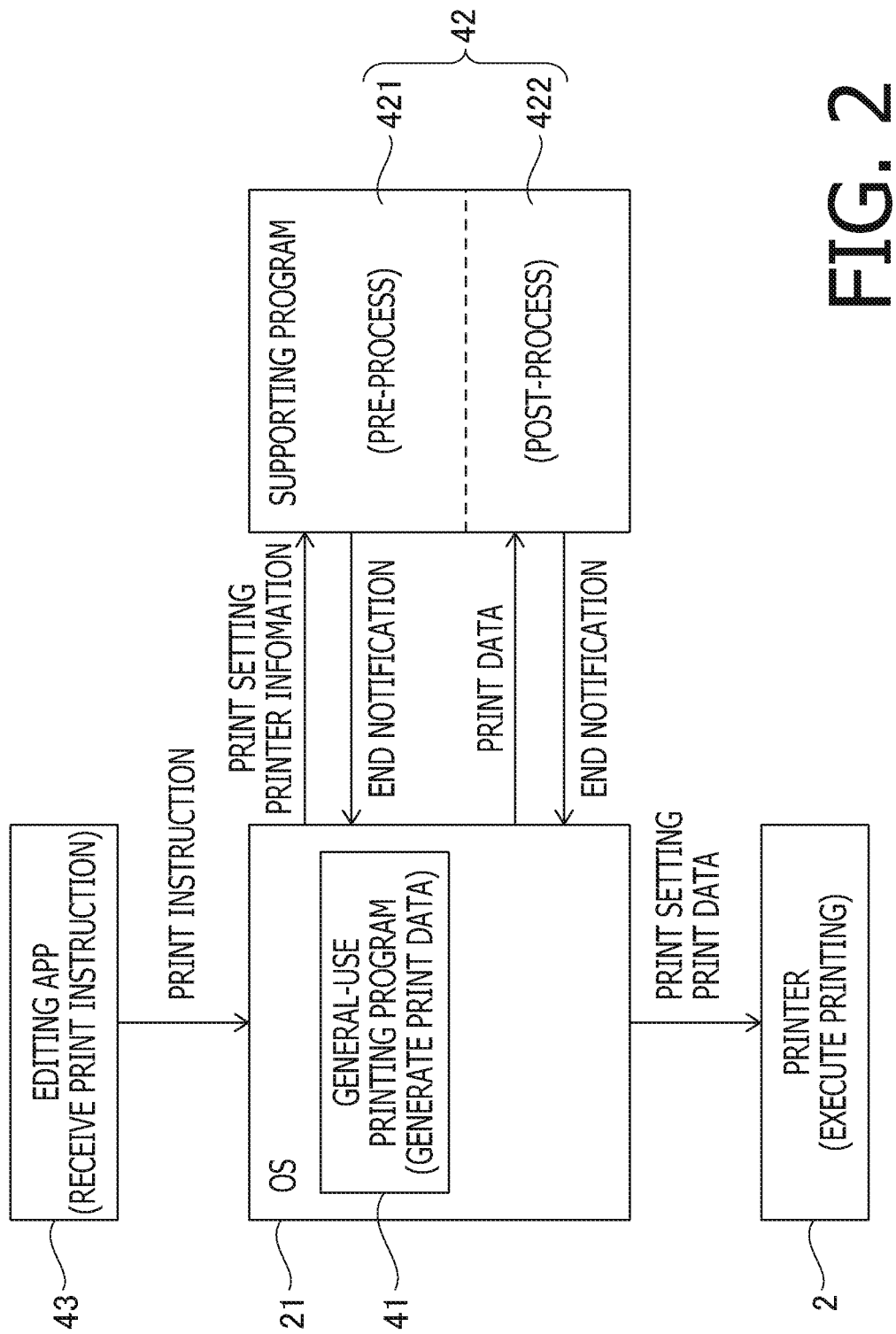
FIG. 2 illustrates an order of processes corresponding to respective programs.

Next, an order of processes performed by respective programs will be described, referring to FIG. 2. In the following description, a case where the PC 1 receives, through the UI 120, an instruction issued by the editing APP 43 to designate image data subjected to print and an instruction to perform printing with the printer 2 through the general-use printing program 41 will be described.

The editing APP 43, which has received the printing instruction, transmits a print execution notification to OS 21 based on the received print instruction. The print execution notification contains, for example, information indicating the printer designated by the print instruction, print settings and information indicating the image data designated by the print instruction. Next, when the supporting program 42 corresponding to the printer 2, which is the printer designated by the print instruction, is stored in the memory 12, the OS 21 instructs the supporting program 42 to perform the process by the supporting program 42 before generation of the print data by the general-use printing program 41.

The supporting program 42 includes a pre-process to be performed before the process by the general-use printing program 41 is started and a post-process to be performed after the process by the general-use printing program 41 is finished and before the print data is transmitted to the printer 2. In the following description, a part of the process among the processes of the supporting program 42 and performed before the process of the general-use printing program 41 is started will be described as a process of a "pre-process supporting program 421" and a part of the process among the processes of the supporting program 42 and performed after the process by the general-use printing program 41 is finished will be described as a process of a "post-process supporting program 422."

In the PC 1 according to the present embodiment, in response to receipt of the print instruction, the process of the pre-process supporting program 421 is performed before the print data is generated by the general-use printing program 41. The pre-process supporting program 421 is configured to obtain various pieces of information contained in the print instruction (e.g., information indicating the print setting, information indicating the printer and the like) from the OS 21. The pre-process supporting program 421 performs the pre-process based on the obtained information and the pre-process supporting program 421 itself and returns an end notification to the OS 21 after the process is finished. Details of the pre-process by the pre-process supporting program 421 will be described later.

When the end notification is received from the pre-process supporting program 421, the OS 21 performs a process based on the general-use printing program 41. The general-use printing program 41 generates the print data from the image data, in accordance with the print instruction.

When the print data has been generated, the OS 21 performs a process based on the post-process supporting program 422 before transmitting the generated print data to the printer 2. The post-process supporting program 422 is configured to obtain not only information regarding the print setting and the printer but also the print data which has already been generated from the OS 21. The post-process supporting program 422 performs the post process based on the obtained information and the post-process supporting program 422 itself and returns the end notification to the OS 21 after the process is finished. Details of the post process based on the post-process supporting program 422 will be described later.

When the OS 21 receives the end notification from the post-process supporting program 422, the OS 21 transmits the print setting and the print data to the printer 2 through the communication I/F 30. It is noted that there may be a case where the print setting set by the editing APP 43 is changed by the pre-process supporting program 421 or the post-process supporting program 422. The printer 2 performs printing based on the received print setting and the print data.

Figure 3:
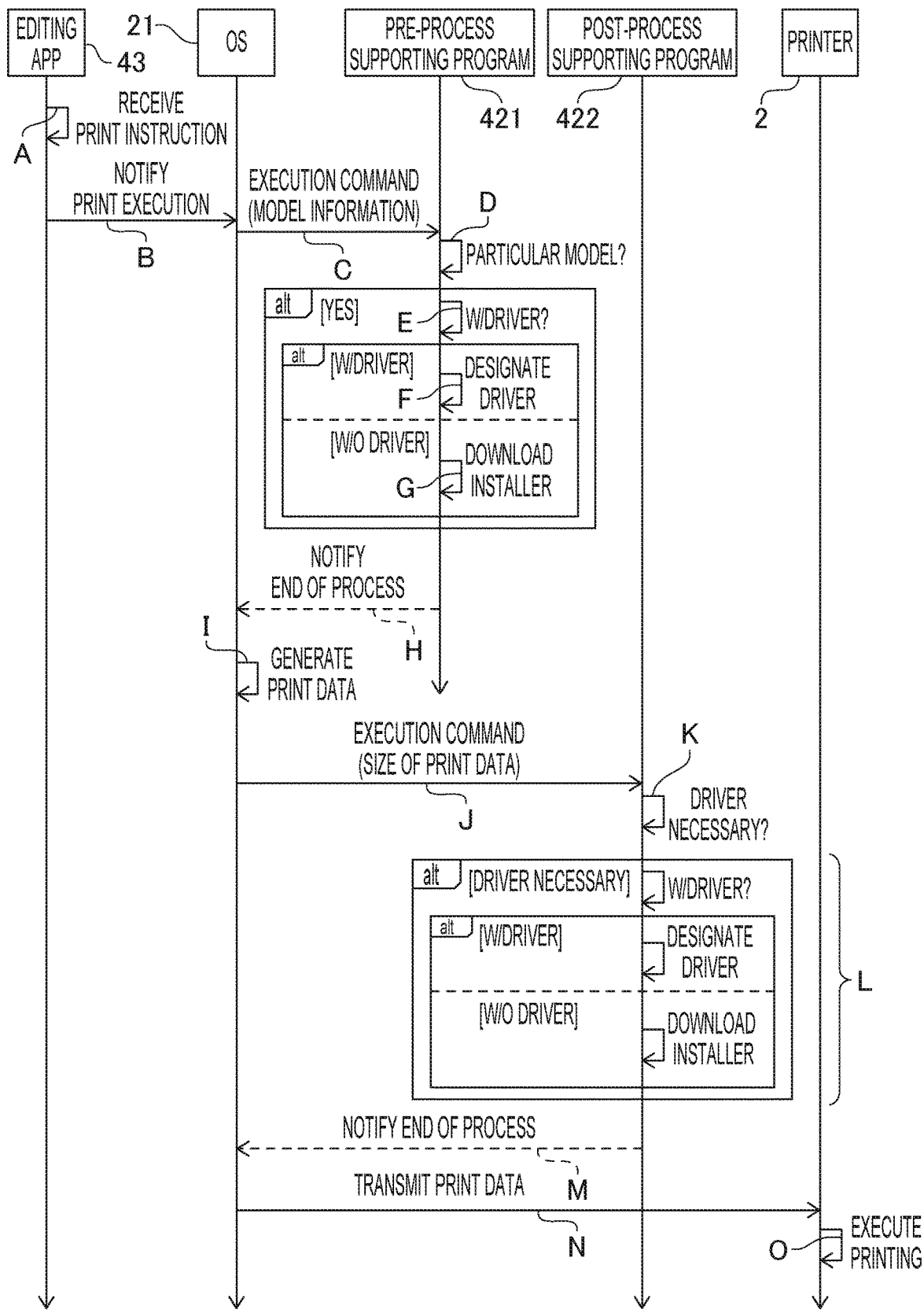
FIG. 3 is a sequential chart illustrating an example of operations corresponding to respective programs.

Next, a printing procedure including processes based on the supporting programs 42 will be generally described with referring to a sequential chart shown in FIG. 3. Firstly, the editing APP 43 receives, through the UI 20, designation of the image data subjected to be printed and an instruction to perform printing (arrow A). Then, the editing APP 43 delivers the print execution notification indicating contents of received instruction to the OS 21 (arrow B).

When detecting the print execution notification output by the editing APP 32, the OS 21 identifies a printer designated as a printer to be controlled to perform printing based on the information contained in the print execution notification. For example, when printing with use of the printer 2 in accordance with the general-use printing program 4 is designated, if the supporting program 42 corresponding to the printer 2 has been incorporated in the general-use printing program 41, the OS 21 outputs an execution command of the supporting program 42. In response to the OS 21 detecting the print execution notification, the execution command is output to the supporting program 42. Thus, outputting of the execution command by the OS 21 is an example of a detection notification to notify that the print instruction is detected.

When the execution command of the supporting program 42 itself is output, the supporting program 42 executes a process based on the pre-process supporting program 421 or the post-process supporting program 422. In this example, the OS 21 outputs the execution command to the supporting program 42 before the general-use printing program 41 starts generating the print data and starts a process based on the pre-process supporting program 421 (arrow C).

The pre-process supporting program 421 according to the present embodiment is configured to obtain the model information of the printer 2 which is designated by the print instruction and determine whether the printer 2 is of a particular model for which usage of a printer driver is recommended (arrow D). When it is determined that the printer 2 is of the particular model, the pre-process supporting program 421 determines whether the printer driver corresponding to the model information of the printer 2 is installed in the PC 1 (arrow E). The pre-process supporting program 421 obtains, for example, the information of the printer drivers implemented in the OS 21 and determines whether the printer driver corresponding to the printer 2 is available.

When the pre-process supporting program 421 determines that the printer driver 44 corresponding to the printer 2 has already been installed in the OS 21, the pre-process supporting program 421 performs a process to make a printing method using the printer driver 44 as a default printing method (arrow F).

In a case where the printer driver 44 is installed in the OS 21, when, for example, a device to perform printing is selected by the editing program 43, a printing method to cause the printer 2 to print using the printer driver 44 and another printing method to cause the printer 2 to print using the general-use printing program 41 can be selected. When the printer driver 44 is used, it is possible to make the printer 2 perform printing using the high-performance printer driver 44. When the pre-process supporting program 421 makes the printing method to cause the printer 2 to print with use of the printer driver 44 as the default printing method, a possibility that this route is selected increases in the nest printing operation onwards.

When it is determined that the printer driver 44 which corresponds to the printer 2 has not been installed, the pre-process supporting program 421 downloads an installer of the printer driver 44 (arrow G) as an operation related to installation of the printer driver 44 in the PC 1.

The printer driver can be installed in the OS 21 of the PC 1 as, for example, the PC 1 downloads the installer and executes the same. The installer of the printer driver 44 is, for example, stored in the server 3, which is a device communicable with the PC 1 through the Internet 100. The pre-process supporting program 421 obtains, for example, information indicating a location, on the network, at which the installer of the printer driver 44 is stored and communicates with the server 3 through the Internet 100, thereby downloading the installer. Then, the printer driver 44 corresponding to the printer 2 can be installed in the PC 1.

In the memory 12 of the PC 1, the model information of the printer 2 is stored as the printer information (i.e., information regarding the printer 2). The model information is information to identify the printer driver 44 corresponding to the printer 2 and an example of driver identifying information.

Further, the pre-process supporting program 421 may store information indicating locations of respective printer drivers 44 for various models. When the printer driver 44 is stored in the server 3 which is accessible through the Internet 100, the pre-process supporting program 421 contains a URL indicating a store location of the installer of the printer driver 44 as information regarding a stored location of the printer driver 44. The pre-process supporting program 421 retrieves the URL indicating the stored location of the installer and downloads the installer.

After arrow F or arrow G, the pre-process supporting program 421 notifies the end of process to the OS 21 (arrow H). It is noted that the OS 21 may start executing an installing process by the installer after downloading of the installer of the printer driver 44 is completed. Thus, a possibility that the printer driver 44 is installed in the OS 21 increases.

In response to the OS 21 receiving the end notification from the pre-process supporting program 421, the OS 21 generates the print data with use of the general-use printing program 41 (arrow I). The print data generated by the general-use printing program 41 is general-use print data and can be commonly used for any of various models of printers 2.

After generation of the print data with use of the general-use printing program 41, the OS 21 outputs again the execution command of the process in accordance with the supporting program 42. Then, the supporting program 42 starts the process according to the post-process supporting program 422 (arrow J). The post-process supporting program 422 obtains the generated print data from the OS 21, and determines whether installation of the printer driver 44 is necessary based on the size of the print data (arrow K). It is noted that, if the printer driver 44 has been downloaded by the pre-process supporting program 421, the post-process supporting program 422 is not necessary to do anything regarding the printer driver 44.

The post-process supporting program 422 may determine that installation of the printer driver 44 is necessary when, for example, the size of the print data is larger than a particular size. When it is determined that installation of the printer driver 44 is necessary, the post-process supporting program 422 performs a process which is the same as the process performed by the pre-process supporting program 421 to download the installer of the printer driver 44 (range L).

Thereafter, the post-process supporting program 422 notifies the OS 21 of the end of process (arrow M). In response to receipt of the end notification from the post-process supporting program 422), the OS 21 transmits the print data to the printer 2 (arrow N), and the printer 2 starts printing (arrow O).

Next, a printing process realizing an operation of the printing system according to the above-described embodiment will be explained, referring to a flowchart shown in FIG. 4. The printing process is performed by the CPU 11 of the PC 1 in response to the OS 21 receiving the print execution notification from the editing APP 43 as the editing APP 43 receives the print instruction (arrow A in FIG. 3) which is an instruction to cause the printer 2 to perform printing with use of the general-use printing program 41.

When the printing process is started, the OS 21 determines whether the supporting program 42 is stored in the memory 12 (S101). As mentioned above, the supporting programs 42 are prepared such that programs corresponding to respective devices are prepared by the venders of the devices. Each supporting program 42 is implemented in the PC 1 by the OS 21 when the OS 21 detects the printer 2. When it is determined that the supporting program 42 is not installed in the PC 1 (e.g., when the supporting program 42 corresponding to the printer 2 is not available) (S101: NO), the OS 21 generates the print data with use of the general-use printing program 41 implemented in the OS 21 (S102).

The OS 21 transmits the print data generated in S102 to the printer 2 (S103) and terminates the printing process. The printer 2 performs printing in accordance with the print data received from the PC 1. It is noted that, when transmission of the print data is failed, the PC 1 may perform a particular error process.

When the supporting program 42 is not installed in the PC 1, the print data is generated by the general-use printing program 41. In this case, the user can use any model of printer 2 in the same manner, without being conscious of the setup of the printer 2. It is noted, however, that printing using the general-use printing program 41 may require a longer time or the quality of the printed matter may be lower in comparison with a case where printing is performed using the high-performance printer driver.

When it is determined that the supporting program 42 is installed in the PC 1 (S101: YES), the OS 21 outputs the execution command to the supporting program 42 corresponding to the printer 2 so that the process according to the pre-process supporting program 421 is started (S105, arrow C in FIG. 3). Then, the CPU 11 executes the pre-process in accordance with the pre-process supporting program 421. Specifically, the OS 21 may input information indicating the pre-process supporting program 421 in the supporting program 42. Alternatively, the OS 21 may cause the memory 12 to store the information indicating the pre-process supporting program 421 and then output the execution command to the supporting program 42 so that the supporting program 42 retrieves the information stored in the memory 12. Further alternatively, the OS 21 may output the execution command designating the process according to the pre-process supporting program 421.

Figure 5:
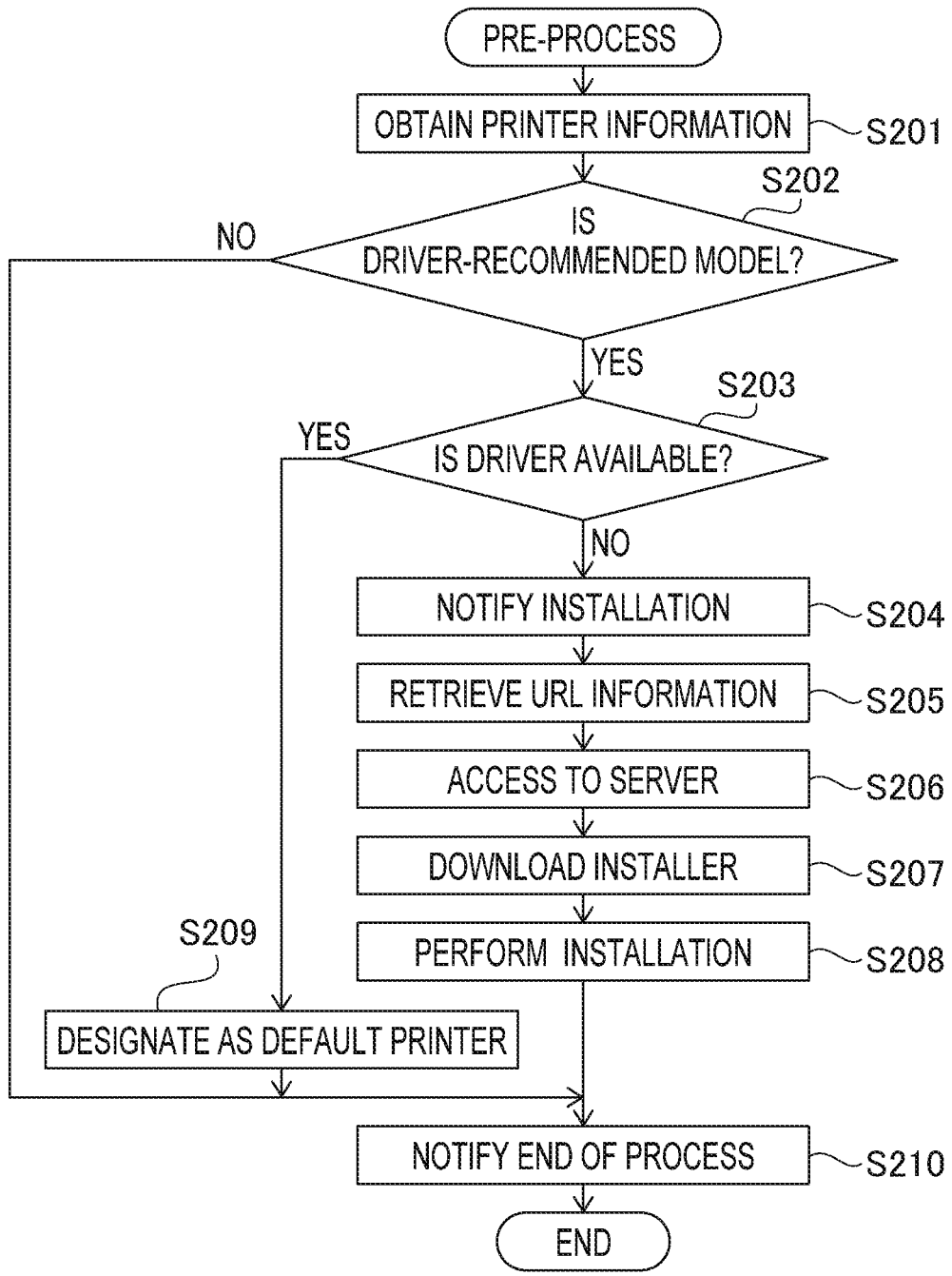
FIG. 5 is a flowchart illustrating a pre-process according to the illustrative embodiment.

Referring to a flowchart shown in FIG. 5, the pre-process will be described. In the pre-process, the supporting program 42 obtains printer information of the printer 2 which is designated as a device to perform printing based on the print setting designated by the print instruction (S201). A process of S201 is an example of an obtaining process. The pre-process supporting program 421 is capable of obtaining the printer information of the printer associated with the pre-process supporting program 421 itself, and various pieces of information set by the print instruction. For example, the supporting program 42 obtains the model information and the access information by inquiring the OS 21 or by referring to the stored locations where the OS 21 stores the information.

The supporting program 42 determines whether the printer 2 is of a particular model, which is recommended to print using the high-performance printer driver 44, based on the model information of the printer obtained in S201 (S202, arrow D in FIG. 3). In the pre-process supporting program 421, model information regarding the model which is recommended to print with use of the printer driver is stored. In S202, the supporting program 42 makes the determination based on the model information obtained in S201 and the model information stored in the pre-process supporting program 421.

For example, the printer of a model for which a high-performance printer driver 44 has been developed may be determined as the model for which usage of the printer driver 44 is recommended. If the printer of a particular model is capable of printing printed matters of which quality is higher or the printing speed is higher in a case where the printer driver 44 is used than in a case where the general-use printing program 41 is used, such a model is an example of the model for which usage of the printer driver 44 is recommended.

Further, there is a possibility that the print data generated by the printer driver 44 is more appropriate for a low-end model which has, for example, a less memory capacity, a less processing speed of the CPU and/or a less number of functions of the image processing module than the print data generated by the general-use printing program 41. Thus, when, for example, the model of the printer 2 is of a low price and a less number of functions, the supporting program 42 determines that printing with use of the printer driver 44 is recommendable. Such a low-end model is an example of a first model, while a high-end model which has a larger memory capacity, a faster processing speed and/or a larger number of functions of the image processing module is an example of a second model.

When it is determined that the model of the printer is one for which printing with use of the high-performance printer driver 44 is recommendable (S202: YES), the supporting program 42 determines whether the printer driver 44 has already been installed based on the printer driver information obtained from the OS 21 (S203, arrow E in FIG. 3).

When it is determined that the printer driver 44 has not been installed (S203: NO), the supporting program 42 performs an operation to install the printer driver 44. That is, the supporting program 42 firstly outputs a notification regarding installation of the printer driver 44 (S204). For example, the supporting program 42 displays a message, on the UI 120, indicating that usage of the printer driver 44 is recommendable.

Next, the supporting program 42 obtains information indicating a location of the storage in which the installer of the printer driver 44 is stored (S205). As mentioned above, the installer of the printer driver 44 is stored, for example, in the server 3 which is accessible through the Internet 100. Accordingly, in S205, if the pre-process supporting program 421 contains URL information indicating the URL of the server 3 which stored the installer of the printer driver 44, the supporting program 42 retrieves the URL information contained in the pre-process supporting program 421.

The supporting program 42 accesses the server 3 through the Internet 100 in accordance with the URL information retrieved in S205 (S206), and obtains the installer of the printer driver 44 by downloading the same (S207, arrow G in FIG. 3). It is noted that the supporting program 42 may display a message indicating that the installer of the printer driver 44 will be downloaded on the UI 20 when the installer of the printer driver 44 is detected in S206. Alternatively, the supporting program 42 may display messages asking a user whether downloading and installing are to be performed on the UI 20 so as to obtain the user's acceptance.

There could be a case where the printer driver 44 is stored in a local server or a memory of the printer 2 itself. When the supporting program 42 is unable to obtain the information of the stored location of the installer of the printer driver 44 in S205, the supporting program 42 may display a screen for receiving a user input on the UI 20 and receive the user input of the location information. In such a case, the supporting program 42 obtains the installer from the storage based on the information input by the user.

The supporting program 42 starts installation of the printer driver 44 by instructing execution of the obtained installer (S208). Specifically, the supporting program 42 delivers information indicating a path of a folder in which the downloaded installer is stored to the OS 21 and instructs the OS 21 to execute installation. According to the present embodiment, when the printer driver 44 has been installed in S208, the printer 2 which is to perform printing with use of the installed printer driver 44 is automatically designated as a default printer. It should be noted that, in S208, the printer 2 using the printer driver 44 installed in S208 may be explicitly designated as a default printer. A process of at least one of S204, S207 and S208 is an example of an installation process. It is noted that only one process (e.g., only S204) may be provided as the installation process. That is, in the pre-process, a message recommending the installation of the printer driver 44 may be displayed and the installation itself may not be performed.

Even if it is determined that the printer driver 44 has been installed, when the printer driver 44 is not of the latest version, the pre-process supporting program 421 may update the printer driver 44. For example, when determination in S201 is "YES," the pre-process supporting program 421 may obtain version information of the printer driver 44 and determines whether the printer driver 44 is of the latest version. Further, when it is determined that the printer driver 44 is not of the latest version, the pre-process supporting program 421 may obtain update data for the printer driver 44 and execute updating of the printer driver 44. In such a case, the pre-process supporting program 421 may contain the URL of the update sever supplied by the vender of the OS 21, and the pre-process supporting program 421 obtains the update data from the storage location indicated by the URL.

On the other hand, when it is determined that the printer driver 44 has been installed (S203: YES), the supporting program 42 designates a route of making the printer 2 perform printing with use of the printer driver 44 as a default printer (S209, arrow F in FIG. 3). A process of S209 is an example of a switching process. In S209, the pre-process supporting program 421 registers the printer 2 with the OS 21 as the printer to be used as a default printer and registers the printer driver 44 with the OS 21 as the program to be used when the printer 2 performs printing.

The supporting program 42 may perform a process of suggesting the user to perform printing with use of the printer driver 44 instead of performing a process to designate the default printer as described above. For example, the supporting program 42 may display, on the UI 20, a message indicating that printing with use of the printer driver 44 can be performed or a message recommending printing with use of the printer driver 44. Even after installation of the printer driver 44 is started in S208, the supporting program 42 may display, on the UI 20, a message recommending that a route of making the printer 2 perform printing with use of the printer driver 44 is designated as a default printer. In the message, a setting method of setting the printing performed by the printer 2 with use of the printer driver 44 as the default printer may be included.

Even when the printer driver 44 has already been installed or has been installed this time, generation of the print data in accordance with the print instruction at this time is performed, as described later, by the general-use printing program 41 and the printer driver 44 as installed is not used. The message is for notifying the user that it becomes possible to make the printer perform high-quality printing by making a setting to perform printing with use of the printer driver 44 in a next and subsequent printing operations.

After execution of S208 or S209, or when it is determined that the printer is not the model which is recommended to perform printing with use of the printer driver 44 (S202: NO), the supporting program 42 notifies end of the pre-process (S210, arrow H in FIG. 3), and terminates the pre-process. The end notification is delivered from the pre-process supporting program 421 to the OS 21.

Figure 4:
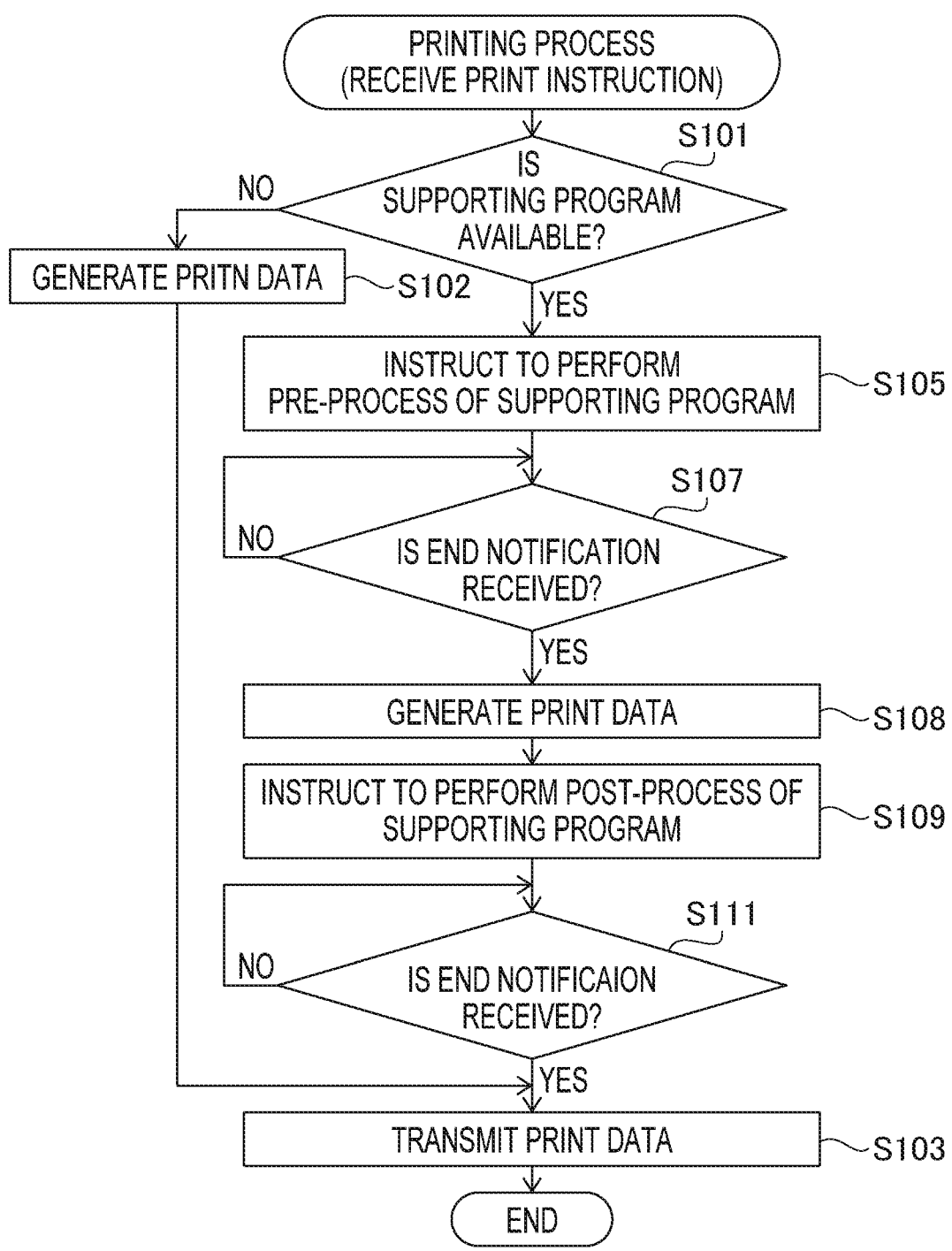
FIG. 4 is a flowchart illustrating a printing process according to the illustrative embodiment.

Returning the description to the printing process shown in FIG. 4, the OS 21 determines whether the end notification is received from the pre-process supporting program 421 (S107). When the pre-process is completed, the OS 21 receives the end notification from the pre-process supporting program 421. When it is determined that the end notification has not been received (S107: NO), the OS 21 awaits until the end notification is received.

When it is determined that the end notification is received (S107: YES), the OS 21 generates the print data using the general-use printing program 41 which is contained in the OS 21 (S108, arrow I in FIG. 3). The process in S108 is the same as the process in S102. After the print data is generated and before it is transmitted to the printer 2, the OS 21 outputs the execution command to the supporting program 42 corresponding to the printer 2 so that the process according to the post-process supporting program 422 is started (S109, arrow J in FIG. 3). Then, the CPU 11 performs the post-process in accordance with the post-process supporting program 422.

It is noted that, when downloading of the installer of the printer driver 44 was started in the pre-process, the post-process may be skipped or no processes may be performed in the post-process except for outputting of the end notification.

Figure 6:
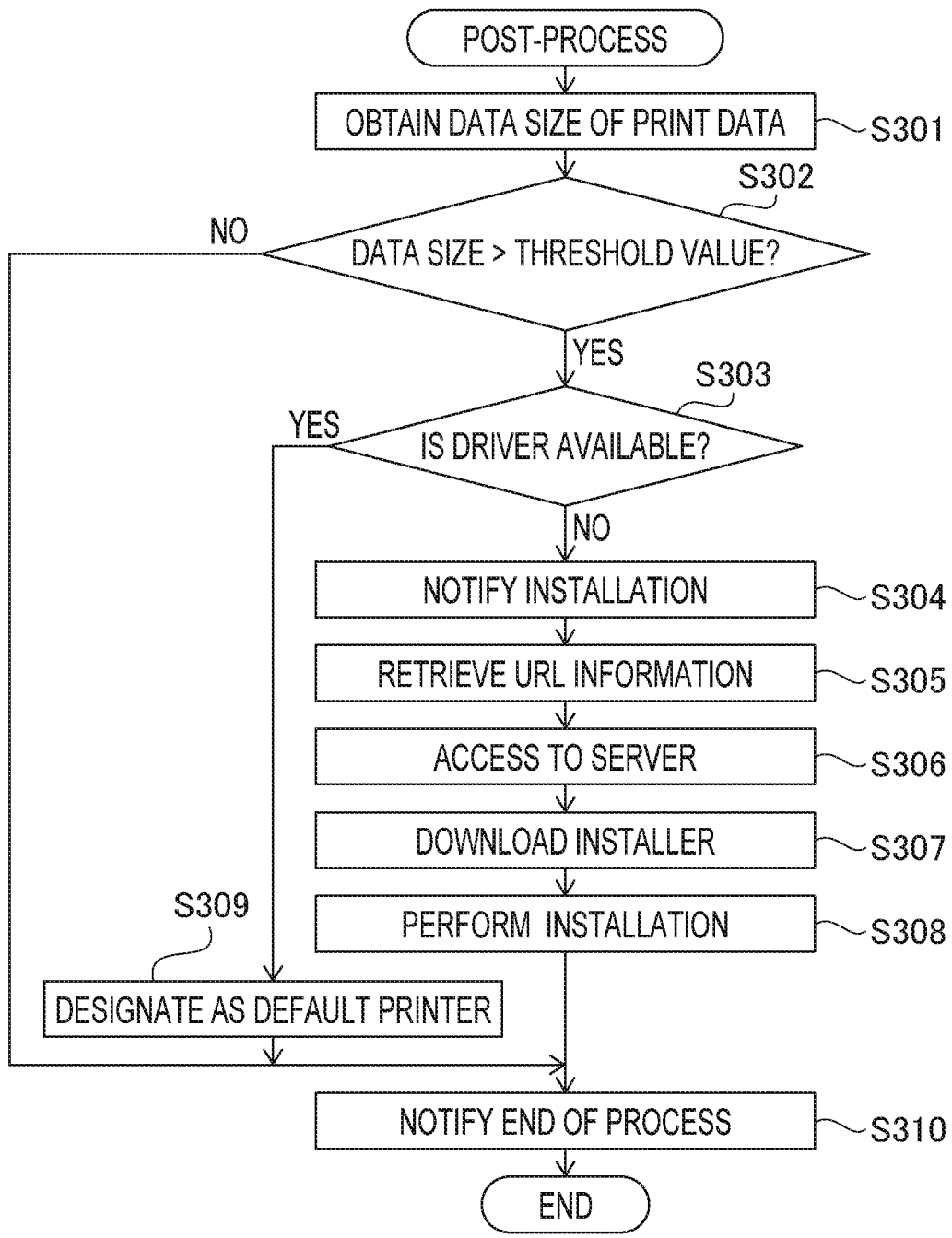
FIG. 6 is a flowchart illustrating a post-process according to the illustrative embodiment.

Referring to a flowchart shown in FIG. 6, the post-process will be described. In the post-process, the supporting program 42 obtains the print data generated by the general-use printing program 41 from the OS 21 (S301). Thus, the supporting program 42 can obtain the data size of the print data. The process in S301 is an example of a print data obtaining process. Then, the supporting program 42 determines whether the data size of the obtained print data is larger than a particular threshold value (S302, arrow K in FIG. 3).

When it is determined that the data size of the print data is larger than the particular threshold value (S302: YES), the supporting program 42 executes an operation regarding installation which is the same as the operation in the pre-process. Concretely, the supporting program 42 determines whether the printer driver 44 has already been installed (S303). When it is determined that the printer driver 44 has not been installed (S303: NO), the supporting program 42 downloads the installer of the printer driver 44 and executes installation of the same (S304-S308). According to the present embodiment, when the printer driver 44 has been installed in S308, the printer 2 which is to perform printing with use of the installed printer driver 44 is automatically designated as a default printer. It should be noted that, in S308, the printer 2 using the printer driver 44 installed in S208 may be explicitly designated as a default printer.

When it is determined that the printer driver 44 has been installed (S303: YES), the supporting program 42 designates that the route of making the printer 2 perform printing with use of the printer driver 44 as the default printer (S309). Processes in steps S303-S309 correspond to the range L in FIG. 3, which are the same processes in S203-S209 in the pre-process.

After execution of S308, after execution of S309 or when it is determined that the data size of the print data is not larger than the particular threshold value (S302: NO), the supporting program 42 notifies termination of the post-process (S310, arrow M of FIG. 3), and terminates the post-process. The end notification is delivered from the post-process supporting program 422 to the OS 21.

The pre-process supporting program 421 can refer to the print setting designated by the print instruction. However, since the print data has not yet been generated, the pre-process supporting program 421 cannot obtain the information regarding the print data (e.g., the data size, the number of commands, the kinds of the commands). In contrast, since the post-process supporting program 422 is started after the print data has been generated, the post-process supporting program 422 can refer to the information regarding the print data and the print data itself. Therefore, even if the printer driver 44 is determined to be unnecessary in the pre-process supporting program 421 (S202: NO), there could be a case where the printer driver 44 is determined to be necessary in the post-process supporting program 421 (S302: YES).

It is noted that, in the post-process, it is determined that installation of the printer driver 44 is necessary when the data size of the print data is large (e.g., the data size of the print data exceeds a particular threshold size). When there are multiple types of printer drivers 44, one which tends to generate the print data of which data size is small may be selected and installed. Alternatively, in the post-process, where or not the printer driver 44 is to be installed may be determined based on an average of data sizes of a plurality of pieces of print data for a plurality of printing processes, whether or not the data size of the print data exceeds a threshold value or the like. Examples of the threshold value may be a maximum data size of the print data for one page of image the printer 2 is capable of processing, a maximum data size of the print data for images printed on both surfaces of a printing sheet, and the like.

Further alternatively, the post-process supporting program 422 may determine whether or not the printer driver 44 is to be installed based on the number of commands contained in the print data. The post-process supporting program 422 may determine, for example, whether the number of commands contained in the generated print data exceeds a particular threshold number in S302, and determine to install the printer driver 44 when it is determined that the number of the commands exceeds the particular threshold number. Alternatively, the post-process supporting program 422 may determine whether or not installation of the printer driver 44 is necessary based on types of commands contained in the print data, the number of pages of images represented by the print data, contents of the print setting contained in the print instruction and the like.

When the data size of the print data is large (e.g., exceeds the particular threshold size) or the number of commands contained in the print data is large (e.g., exceeds the particular threshold number), the print data generated by the general-use printing program 41 may not have been generated appropriately. In such a case, by performing printing with use of the printer driver 44, appropriate data conversion is performed and print data of less number of commands and/or less size may be generated. When the print data of the small data size or the small number of commands is generated, a processing amount by the printer 2 is reduced and it becomes possible that the printed matter can be obtained earlier. Thus, the data size of the print data being larger than the particular threshold size is an example of a condition to use the printer driver 44. Similarly, the number of commands contained in the print data exceeding the particular threshold number is an example of a condition to use the printer driver 44.

Returning to the printing process shown in FIG. 4, the OS 21 determines whether the post-process supporting program 422 receives the end notification (S111). When the post-process is finished, the OS 21 receives the end notification from the post-process supporting program 422. When it is determined that the end notification has not been received (S111: NO), the OS 21 awaits until the end notification is received.

When it is determined that the end notification has been received (S111: YES), the OS 21 transmits the print data to the printer 2 (S103, arrow N in FIG. 3), and terminates the printing process. The printer 2 performs printing in accordance with the print data received from the PC 1.

As described in detail above, with the supporting program 42 according to the present embodiment, when the OS 21 receives the print instruction through the general-use printing program 41 and when the high-performance printer driver 44 corresponding to the printer 2, which is subjected to the print instruction, is not installed in the OS 21, the operation regarding installation of the printer driver 44 to the OS 21 is performed so that the printer driver 44 is installed. According to such a configuration, in the next printing process onwards, the printer driver 44 can be used and usability of the printer 2 is improved.

With the supporting program 42 according to the present embodiment, by notifying the installation of the printer driver 44 to the user, as the operation relating to the installation, the user can recognize the installation of the printer driver 44. Alternatively, as the operation relating to the installation, downloading of the installer and starting the installation may be performed, thereby the printer driver 44 being installed.

Depending on the models of the printers, there are some which do not necessary the printer drivers (e.g., ones of which performance does not improve even if the printer driver is used, ones for which the printer driver cannot be downloaded or the like). Therefore, by determining necessity of installation of the printer driver to the OS 21 based on the model of the printer, useless processes can be eliminated.

There is a case where the general-use printing program, which is an OS-standard printing program, (i.e., the general-use printing program 41) is designated although the printer driver 44 has already been installed in the OS 21, by performing an operation regarding switching to the printer driver 44 to notify the user of switching of a normally used printer, a possibility that the printer driver is used in the next printing process onwards is increased, thereby usability of the printer being improved.

By performing the operation regarding the installation of the printer with use of the pre-process supporting program 421, installation of the printer driver is started earlier and the printer driver 44 can be used earlier. Thus, a possibility that the printer driver is used in the next printing process is increased.

After generation of the print data has been completed, necessity of the printer driver (e.g., whether the usage condition of the printer driver 44 is satisfied) is determined and an unnecessary installation can be avoided.

For example, when the data size of the print data is large, it is likely that appropriate print commands are not generated. Accordingly, in such a case, by installing the printer driver 44 in the OS 21 and generating the print data with use of the printer driver, a possibility that appropriate print commands are generated is increased.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the printer, but any device which has a printing function (e.g., an MFP, a copier, a facsimile machine and the like). Further, the number of printers (devices) connected to the PC 1 need not be limited to one but multiple devices may be simultaneously connected to the PC 1.

In the above-described embodiment, the supporting program 42 includes the pre-process and the post-process. However, according to aspects of the disclosures, the supporting program 42 may include only one of the pre-process and the post-process. That is, the supporting program 42 may include only the post-process supporting program 422 which is started after the print data is generated. In such a case, the post-process supporting program 422 may determine necessity/unnecessity of the printer driver 44 by performing both a determination based on the model information of the printer 2 and a determination based on the data size of the print data or only one of them. Further, the pre-process supporting program 421 and the post-process supporting program 422 may be separate programs.

It is noted that the modules respectively performing the pre-process and the post-process need not be limited to the supporting program 42 (i.e., the pre-process supporting program 421 and the post-process supporting program 422), but programs configured to receive an instruction of the OS 21 when printing is performed with use of the general-use printing program 41 implemented in the OS 21. For example, such a program may be a Print workflow APP of which specification is opened by Microsoft Corporation.

In S202 of the pre-process, whether usage of the printer driver 44 is recommended is determined based on the model of the printer 2. This configuration may be modified such that whether usage of the printer driver 44 is recommendable based on the print setting contained in the print instruction. For example, when the print instruction contains a particular print setting which is difficult to be processed by the general-use printing program 41, determination in S202 may be "YES." Similarly, in the post-process, whether usage of the printer driver 44 is recommendable is determined based on the print setting. Alternatively, whether the printer 2 is of the model to which usage of the printer driver 44 is recommendable may be asked to the server 3.

In the above-described embodiment, whether the usage of the printer driver 44 is recommended is determined based on the model information of the printer 2. It is note that such a determination may not be performed. For example, when the supporting program 42 corresponding to a particular model is available, there is a possibility that a high-performance printer driver 44 corresponding to the model is definitely available. In such a case, control may proceed to S203 with skipping S202 of the pre-process.

In the above-described embodiment, the supporting program 42 downloads the installer. This configuration can be modified such that information indicating the storage location of the installer is delivered to the OS 21 and the OS 21 downloads the installer and executes the downloaded installer. Alternatively, the information indicating the storage location of the installer is delivered to a browser and downloading and installation may be performed through the browser. In such a case, the browser which has obtained the information indicating the storage location of the installer may perform downloading and installation of the installer.

When, for example, access to the server 3 is failed or the installer cannot be found, an error history log may be remained after completion of printing. Further, for example, notification of installation and the like may be performed by means of voice guidance instead of or in addition to displayed messages.

After installation of the printer driver 44 is executed in the pre-process (i.e., after execution of S208) or after printing with use of the printer driver 44 is set as the default printer (i.e., after execution of S209), the supporting program 42 may terminates the printing process by the OS 21. As a method of terminating the printing process, for example, a command to terminate the printing process may be output to the OS 21, an output destination of the print data may be switched to a port to which no device is connected, or a command causing the printer to read and discard the print data may be added to the print parameters. Further, in order to terminate the printing process, a message recommending printing with use of the printer driver 44 may be displayed.

Alternatively, after execution of S208 or S209, the supporting program 42 may display the message recommending printing with use of the printer driver 44, and output an instruction to terminate the printing process to the OS 21 when a user's operation of agreement is received.

In the above-identified embodiment, as an operation of the supporting program 42, only a function of recommending printing with use of the printer driver 44 is described. It is possible that the supporting program 42 may realize further functions. When the supporting program 42 is configured to realize further functions, the further functions may be performed, for example, before execution of S210 of the pre-process or before execution of S310 in the post-process. For example, if the supporting program 42 is configured to customize a print mode, information regarding customization may be output to the printer 2 or the OS 21 before execution of S210. Further, if the supporting program 42 is configured to perform modification of the print data, modification of the print data generated by the general-use printing program 41 may be performed before execution of S310.

When the printer driver 44 is installed in accordance with the method indicated in the above-described embodiment, setup of the printer driver 44 may be performed automatically. For example, information regarding the printer 2 is transmitted to the server 3 as well as an instruction to download the printer driver 44, and the information of the printer 2 is obtained from the server 4 after installation of the printer driver 44 so that setup of the printer driver 44 is automatically performed.

In the above-described embodiment, as the execution command is output from the OS 21 to the supporting program 42, the supporting program 42 is started up. It is noted that a startup timing of the supporting program 42 need not be limited to the above timing. For example, the supporting program 42 may be always running. In such a case, the supporting program 42 may simply perform the operations described above in response to receipt of the execution command.

In the above-described embodiment, the technique of installing the printer driver which is a program for controlling the printer is disclosed. Aspects of the present disclosure are applicable to a scanner driver which is a program for controlling a scanner.

It is noted that, in any of the flowcharts according to the embodiment, an execution order of arbitrary multiple processes performed in multiple steps may be changed arbitrary as far as consistency is maintained in the contents of the multiple processes.

It is noted that the processes disclosed in the above-described embodiment may be performed by a single CPU, multiple CPU's, hardware such as an ASI or combination thereof. Further, the processes disclosed in the above-described embodiment may be realized in various mode such as a non-transitory computer-readable recording medium containing instructions realizing programs to execute respective processes, a method of performing the respective processes and the like.

What is claimed is:

1. A non-transitory computer-readable recording medium storing instructions executable by a controller of an information processing apparatus, the instructions comprising a support program supporting operations of a printing program having been implemented, in advance, in an operating system of the information processing apparatus, the support program causing, when executed by the controller, the information processing apparatus to perform:

in a case where a print instruction to cause a currently connected printer to perform printing is input through the general use printing program, obtaining printer information stored in a memory of the information processing apparatus;

in a case where driver identifying information identifying a printer driver which is different from the general-use printing program but corresponds to the currently connected printer is contained in the printer information, determining whether the printer driver identified by the driver identifying information contained in the printer information has already been installed in the operating system; and in a case where it is determined by the support program that the printer driver identified by the driver identifying information corresponding to the currently connected printer which is instructed to perform printing by the print instruction has not been installed in the operating system, causing the information processing apparatus to perform an operation instructed by the support program to have the printer driver identified by the driver identifying information corresponding to the currently connected printer which is instructed to perform printing by the print instruction installed in the operating system.

2. The non-transitory computer-readable recording medium according to claim 1,
wherein the operation regarding the installation of the printer driver in the operating system includes notification of the installation of the printer driver.

3. The non-transitory computer-readable medium according to claim 1,
wherein the operation regarding the installation of the printer driver in the operating system includes at least one of downloading of an installer of the printer driver and execution of installation of the printer driver.

4. The non-transitory computer-readable medium according to claim 1,
wherein, in a case where the model of the printer indicated by the printer information is a first model, the instruction further causes the information processing apparatus to execute the installation of the printer driver; and
wherein, in a case where the model of the printer indicated by the printer information is a second model, the instruction causes the information processing apparatus not to execute the installation of the printer driver.

5. The non-transitory computer-readable medium according to claim 1,
wherein, in a case where the printer driver identified by the driver identifying information contained in the printer information is installed in the operating system, the instruction further causes the information processing apparatus to execute an operation regarding switching to the printer driver.

6. The non-transitory computer-readable medium according to claim 1,
wherein the instruction further causes the information processing apparatus to execute the installation of the printer driver before the operating system finishes generating print data with use of the print program.

7. The non-transitory computer-readable medium according to claim 1,
wherein, in a case where the operating system is configured to detect the print instruction, and output, to the printer, a detection notification notifying detection of the print instruction after detection of the print instruction and before transmission of print data corresponding to the print instruction, the instructions cause the information processing apparatus to obtain the printer information stored in the memory of the image processing apparatus in response to output of the detection notification.

8. The non-transitory computer-readable medium according to claim 7,
wherein the operating system is configured to output the detection notification before generation of the print data is started, and
wherein, in a case where the detection notification is output, the instructions cause the information processing apparatus to install the printer driver before the operating system starts generating print data.

9. The non-transitory computer-readable medium according to claim 7,
wherein the operating system is configured to output the detection notification after generation of the print data and before transmitting the generated print data,
wherein, in a case where the detection notification is output, the instructions cause the information processing apparatus to obtain the print data generated by the operating system, and
wherein, in a case where the print data as obtained satisfies usage condition of the printer driver, the instructions cause the information processing apparatus to install the printer driver before the operating system transmits the print data to the printer.

10. The non-transitory computer-readable medium according to claim 1,
wherein the instructions causes the information processing apparatus to:
in a case where the operating system has generated the print data and the generated print data satisfies a usage condition of the printer driver, perform installation of the printer driver; and
in a case where the operating system has generated the print data and the generated print data does not satisfy the usage condition of the printer driver, not perform installation of the printer driver.

11. The non-transitory computer-readable medium according to claim 10,
wherein the usage condition of the printer is satisfied in a case where the data size of the print data is larger than a particular threshold value.

12. The non-transitory computer-readable medium according to claim 1,
wherein the operation system is configured to install instructions representing another support program corresponding to another printer different from the printer,
wherein the information processing apparatus is configured to store identification information and printer information for each of installed support programs in an associated manner in the memory, and
wherein the operating system is configured to perform a process of the support program indicated by the identification information corresponding to the printer information of the printer subjected to the print instruction.

13. The non-transitory computer-readable medium according to claim 1,
wherein different printer drivers are available for different models of printers, respectively, and
wherein the printing program is compliant to a plurality of models of printers.

14. An information processing apparatus, comprising:
a memory;
a non-transitory computer-readable recording medium; and
a controller,
wherein computer-executable instructions are stored in the recording medium, the computer-executable instructions comprising a support program supporting operations of a general use printing program having been implemented, in advance, in an operating system of the information processing apparatus, the supporting program being a program, the support program being installed in the information processing apparatus,
wherein the memory stores printer information regarding the printer, the printer information including driver identifying information, the driver identifying information identifying a printer driver which is different from the general-use printing program but corresponds to the printer,
wherein the support program causes, when executed by the controller, the information processing apparatus to perform:
in a case where a print instruction to cause a currently connected printer to perform printing is input through the printing program, obtaining printer information stored in a memory of the image processing apparatus;
in a case where the printer driver corresponding to the currently connected printer identified by the driver identifying information corresponding to the currently connected printer which is instructed to perform printing by the print instruction is not installed in the operating system, performing an operation instructed by the support program to have the printer driver identified by the driver identifying information corresponding to the currently connected printer which is instructed to perform printing by the print instruction installed in the operating system.

15. A printing method of an information processing apparatus, instructions comprising a support program supporting operations of a general-use printing program having been implemented, in advance, in an operating system of the information processing apparatus, the printing program being different from a printer driver,
wherein a memory of the information processing apparatus stores printer information regarding the printer, the printer information including driver identifying information, the driver identifying information identifying a printer driver which is different from the general-use printing program but corresponds to the printer, the method causing the printer to perform printing based on print data, the print data being generated by the information processing apparatus,
wherein the method includes:
in a case where a print instruction to cause a currently connected printer to perform printing is input through the printing program, obtaining the printer information stored in the memory; and
in a case where a printer driver corresponding to the currently connected printer identified by the driver identifying information corresponding to the currently connected printer which is instructed to perform printing by the print instruction is not installed in the operating system, causing the information processing apparatus to perform an operation instructed by the support program to have the printer driver identified by the driver identifying information corresponding to the currently connected printer which is instructed to perform printing by the print instruction installed in the operating system.

* * * * *

UNITED STATES PATENT AND TRADEMARK OFFICE
CERTIFICATE OF CORRECTION

| | |
|---|---|
| PATENT NO. | : 11,321,027 B2 |
| APPLICATION NO. | : 16/689136 |
| DATED | : May 3, 2022 |
| INVENTOR(S) | : Kazutaka Yamada |

It is certified that error appears in the above-identified patent and that said Letters Patent is hereby corrected as shown below:

In the Claims

Column 17, Claim 1, Line 63 should read:
support program supporting operations of a general-use printing pro-
Column 18, Claim 1, Line 3 should read:
the general-use printing program, obtaining printer
Column 18, Claim 6, Line 60 should read:
generating print data with use of the general-use printing program.
Column 19, Claim 13, Line 64 should read:
wherein the general-use printing program is compliant to a plurality of
Column 20, Claim 14, Line 7 should read:
operation of a general-use printing program having
Column 20, Claim 14, Line 14 should read:
a printer, the printer information including driver
Column 20, Claim 14, Line 24 should read:
the general-use printing program, obtaining printer information
Column 20, Claim 14, Line 25 should read:
stored in the memory of the image processing apparatus;
Column 20, Claim 15, Line 45 should read:
tus stores printer information regarding a printer, the
Column 20, Claim 15, Line 56 should read:
through the general-use printing program, obtaining the printer Signed and Sealed this
Third Day of January, 2023

Katherine Kelly Vidal
*Director of the United States Patent and Trademark Office*